Figure 1:
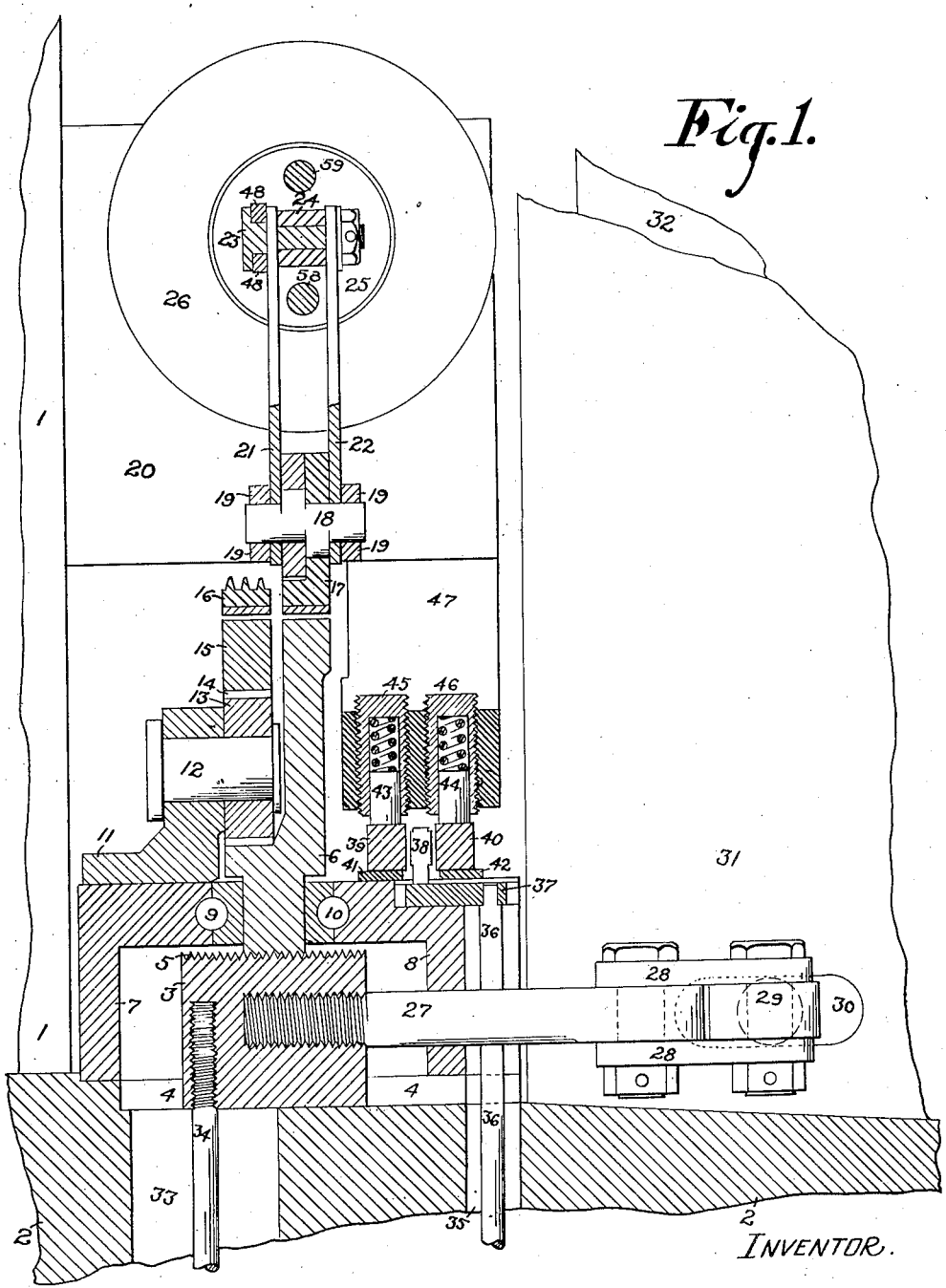

Oct. 24, 1933.   C. W. LAMBERT   1,931,583
AUTOMATIC VARIABLE PITCH PROPELLER
Filed Nov. 22, 1932   4 Sheets-Sheet 1

INVENTOR.
Chandley W. Lambert.

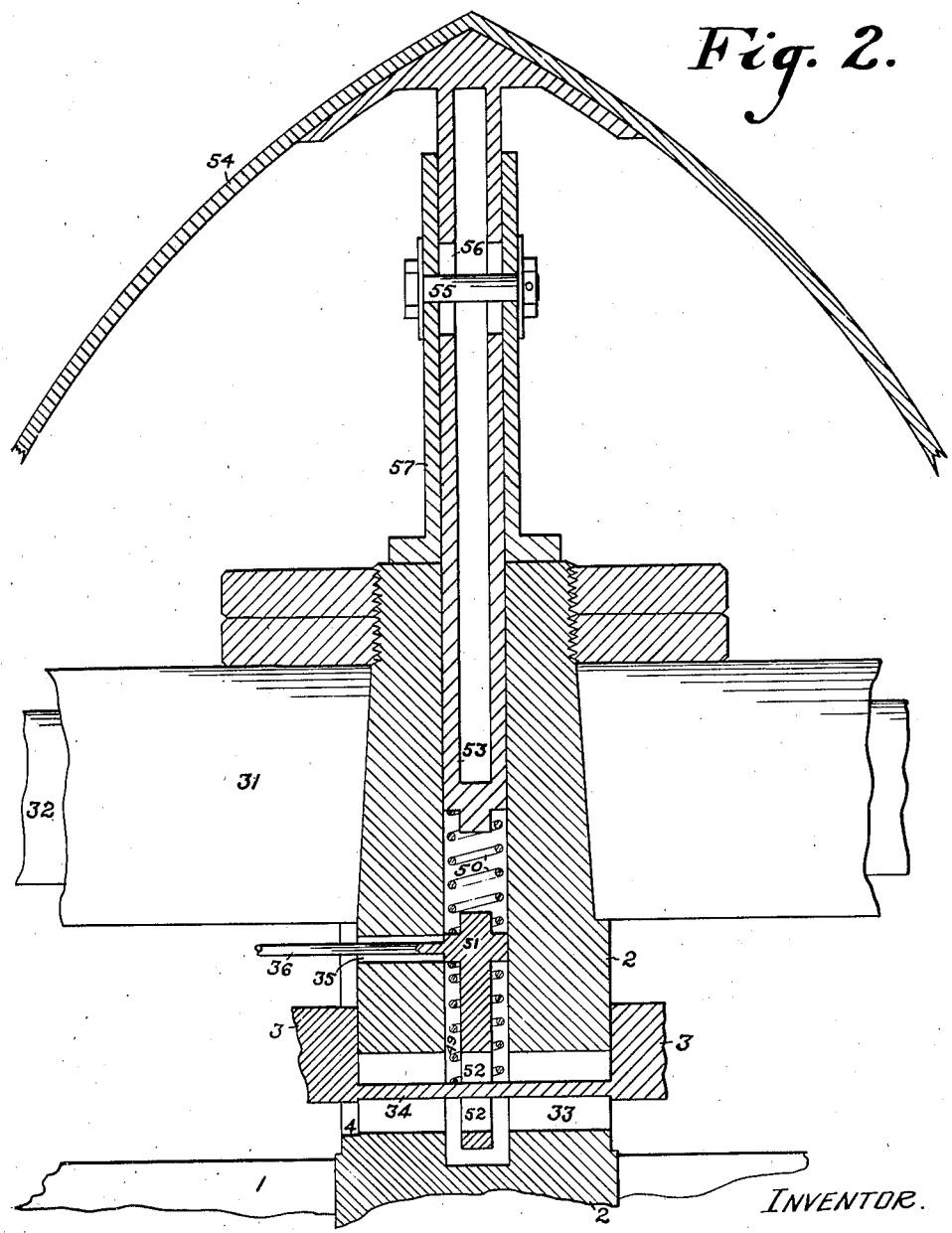

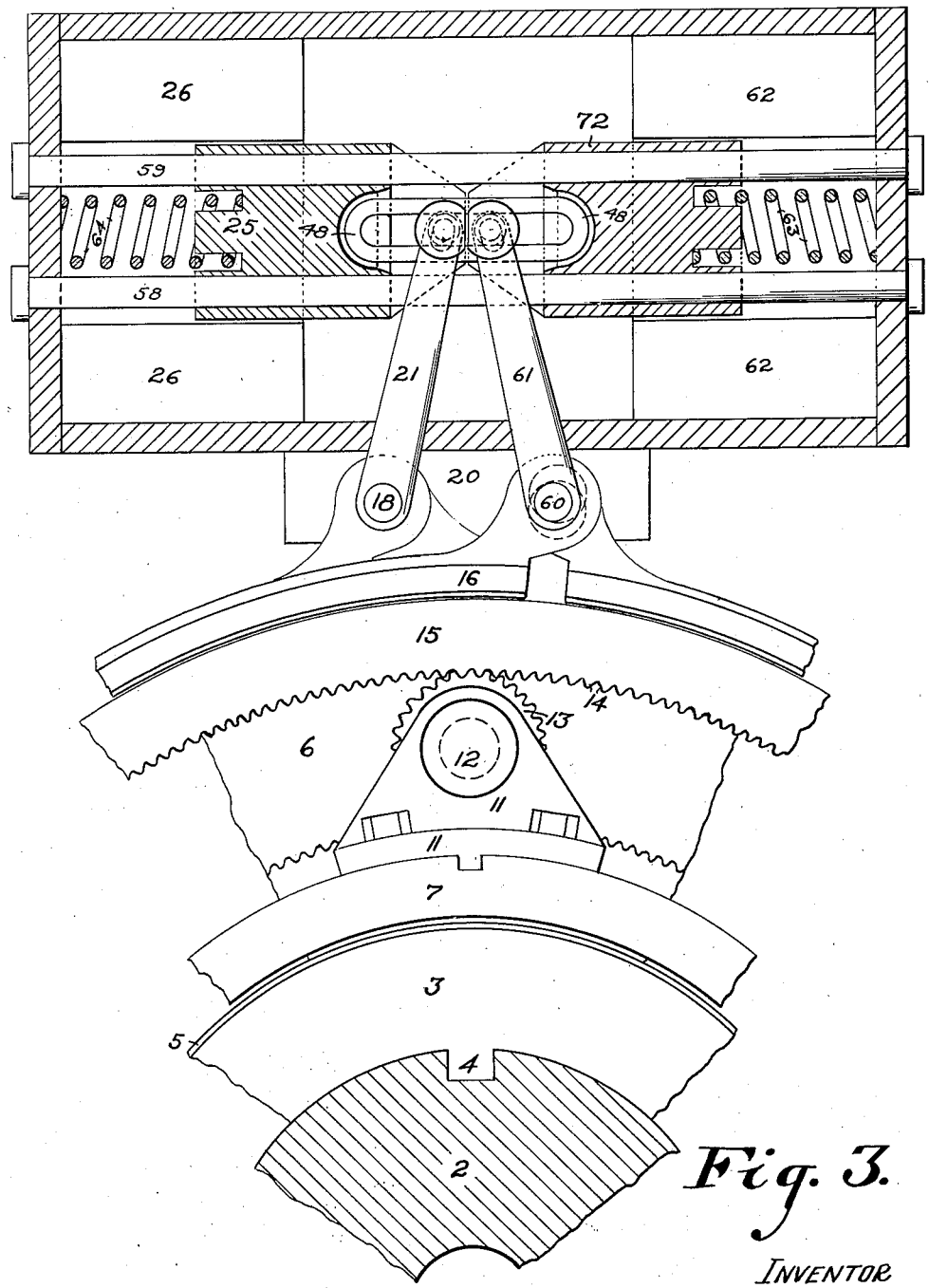

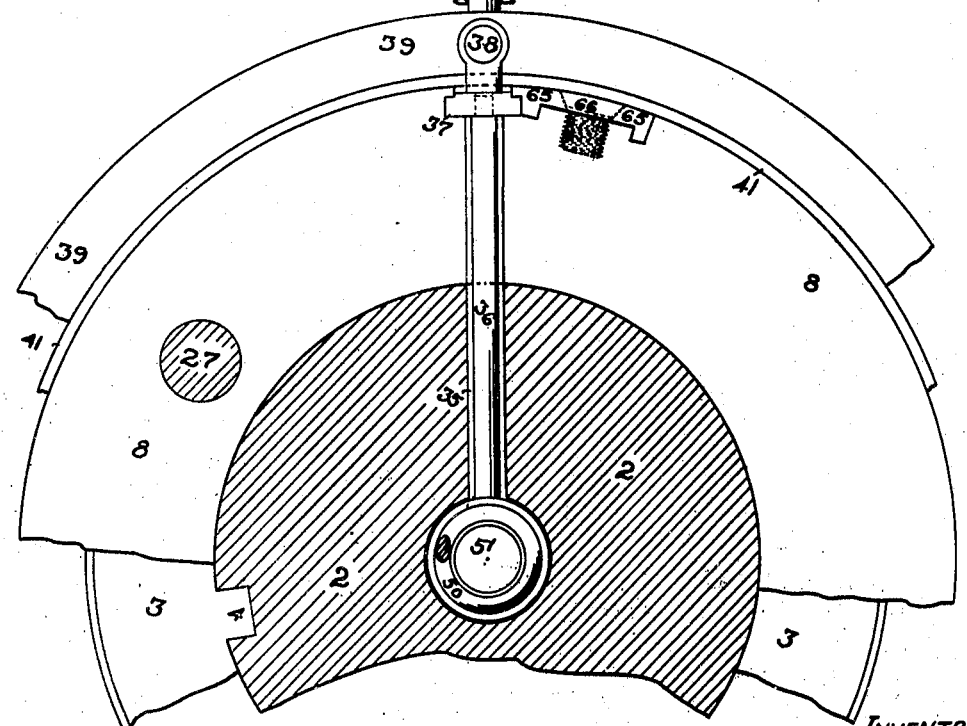

Patented Oct. 24, 1933

1,931,583

UNITED STATES PATENT OFFICE 1,931,583

AUTOMATIC VARIABLE PITCH PROPELLER

Chandley W. Lambert, Cleveland, Ohio

Application November 22, 1932
Serial No. 643,839

8 Claims. (Cl. 170—162)

One form of the invention is shown in the accompanying drawings in all figures of which similar parts are numbered the same.

Fig. 1 is a longitudinal cross section showing part of the invention, especially the application of reversible power to the propeller blade. Fig. 2 is a continuation of Fig. 1, at a smaller scale, showing part of the automatic control. Fig. 3 is a transverse cross-section of part of the device shown in Fig. 1. Fig. 4 is a transverse cross-section showing other views of parts in Fig. 1. Fig. 5 is a longitudinal cross-section of the control switch also shown in Fig. 1 and Fig. 4; but Fig. 5 is at a larger scale and a method of adjusting the switch contacts is shown.

In Fig. 1, 1 is the engine crank case or portion of the fuselage, 2 the propeller shaft, 3 is a longitudinally slidable collar feathered at 4 to shaft 2, 5 is an external thread on collar 3, with which internal threads on wheel 6 engage. 7 and 8 are annular end thrust bells secured to shaft 2 and holding annular thrust bearings 9 and 10 against the sides of wheel 6. 11 is a bracket secured to end bell 7 and carrying pivot 12 for one of spaced spur gears 13 engaging a gear on wheel 6. Gears 13 also engage interior teeth 14 of ring gear 15 the external face of which is a brake drum to engage brake shoe 16. Brake shoe 17 may engage wheel 6.

Brake shoe 17 is actuated by cams on pin 18, in bearings 19—19 on bracket 20, when rotated by lever arms 21—22 which are attached to pin 18. Pin 23 connects levers 21—22 and extension 24 of solenoid 25, slidable on guides 58—59 in electrical coil 26.

Collar 3 is connected by push-pull rod 27, by links 28—28, arm 29 in closed slot 30 in hub 31, to propeller blade shank 32.

Secured to collar 3 is rod 34, movable in closed slot 33 in shaft 2.

In closed slot 35 is rod 36, which transmits longitudinal movement to slider 37 and contact 38. 39 and 40 are annular contact rings separated from end bell 8 by insulation rings 41 and 42. Brushes 43 and 44 are held in contact with rings 39 and 40 by compression springs in tubes 45 and 46, which are secured to bracket 20 by insulating brush holder 47.

In Fig. 2, rod 34 (Fig. 1) contacts compression spring 49, and also passes through closed slot 52—52 in an extension arm attached to control plate 51 to which arm 36 (Fig. 1) is secured. Plate 51 contacts compression springs 49 and 50. Spring 50 contacts extension arm 53 to which pressure plate 54 is secured. Pin 55 in closed slot 56 of extension 53, also passes through tube 57 which is secured to shaft 2.

In Fig. 3, 2 is a broken transverse cross-section of shaft 2, Figs. 1 and 2. 3 is the collar, feathered at 4 to shaft 2, having external threads 5. 7 is an end bell, 11 the bracket holding pin 12 and gear 13 which engages a gear on wheel 6 and also internal gear 14 of ring gear 15. Brake shoe 16 is actuated by cams on pins 60, which is rotated by lever arm 61.

Secured to bracket 20 are magnetic coils 26—62, within which are slidable armatures 25 and 72, acting against compression springs 63—64. Closed link 48, (Figs. 1 and 3) slidable on the pins through the upper ends of the brake lever arms 21—61, is long enough to allow only one armature, 25 or 72, to slide on guides 58 and 59 towards its electromagnet. This forms a mechanical interlock preventing the simultaneous application of the brakes 16 and 17.

In Fig. 4 are shown shaft 2, collar 3, end bell 8, rod 27 extending through end bell 8, insulation ring 41, collector ring 39, control plate 51, compression spring 50, rod 36, slider 37, (see also Fig. 5), contact 38, brush 43, brush holder 45, insulating support 47, bracket 20, slider guide 65 held by screw 66.

Fig. 5 is on a larger scale. The end 67 of rod 36 is squared, so that slider 37 prevents rod 36 from backing out of the thread in plate 51. Slider 37 carries a switch contactor 38, which by contact with adjustable contact points 68 or 69, energizes coil 26 or coil 62 (Fig. 3). These adjustable contacts, 68 and 69, can be adjusted to produce quick or slow response of the pitch changing to changes of air speed of the plane.

The invention operates as follows:—Changes of air speed produce changes of fluid pressure upon pressure plate 54, which are transmitted to compression spring 50 and to control plate 51. Now pressure on spring 49, by rod 34, is responsive to movement of collar 3, and is therefore a measure of the existing pitch of the propeller blades. Pressure on spring 50 is a measure of the air-speed.

When the pitch is right for a given air-speed, the control plate 51 is centralized and contact switch 38 is open, as shown in Figs. 1 and 5. When the air-speed increases, pressure on spring 50 becomes greater than the pressure on spring 49, control plate 51 moves rearwardly, switch 38 contacts contact 68, completing the electrical circuit through coil 26, brake 17 is applied to wheel 6, which is retarded. Collar 3 moves forwardly, rotating shank 32 into a position of higher pitch. This increases the pressure on spring 49, soon causing switch 38 to break contact, opening the circuit; the pressure on springs 49 and 50 are equalized and the pitch is right for the air-speed at the instant pertaining.

Decrease of air speed allows spring 49 to overcome spring 50. Plate 51 moves forwardly, 38 contacts 69, energizing coil 62, contracting brake 16 on drum, or ring gear, 15, which is retarded. Gear 13 is carried around at shaft speed, wheel 6 is accelerated above shaft speed, collar 3 moves rearwardly, lowering the pitch of the propeller blades.

Should the maximum or minimum pitch be reached, rod 34 (Fig. 2) will contact an end of closed slot 52 in the extension of plate 51, breaking the contact at switch 38 and prohibiting further action in the one direction but not preventing it in the other.

I claim,

1. A propeller shaft, a hub secured to said shaft, a propeller blade shank rotatable relatively to said hub, a collar slidable on said shaft, means for rotating said shank by said collar, a brake wheel cooperating with said collar, means comprising gears cooperating with said wheel for reversing the direction of rotation of said wheel relatively to said shaft and said collar, brake shoes cooperating with said wheel and said reversing means, means controlling operation of said brake shoes on said wheel and on said reversing means, selective means cooperating with said collar and a pressure plate for controlling said control means.

2. A propeller shaft, a hub secured to said shaft, a propeller blade shank rotatable relatively to said hub, a collar longitudinally slidable on said shaft, means for rotating said shank by movement of said collar, a brake wheel cooperating with said collar, reversing means for said wheel, brake shoes cooperating with said wheel and said reversing means, a restrictedly slidable pressure plate on said shaft, opposing compression springs cooperating with said collar and said pressure plate for selectively operating said control means.

3. A propeller shaft, a hub secured to said shaft, a propeller blade shank rotatable in said hub, a slidable collar on said shaft, means for rotating said shank by movement of said collar, an external thread on said collar, a brake wheel cooperating with said threaded collar, means comprising gears and a brake drum for accelerating said wheel, brake shoes cooperating with said wheel and said drum, electrical means controlling the operation of said brake shoes, a selective switch controlling said electrical means, a movable fluid pressure plate, compression springs cooperating with said collar and said pressure plate for operating said switch.

4. A propeller shaft, a hub secured to said shaft, a rotatably mounted propeller blade shank coaxial with said hub, a collar on said shaft, said collar cooperating with said shank, an external thread on said collar, a brake wheel cooperating with said thread, a brake shoe cooperating with said wheel for retarding said wheel relatively to said collar, means comprising gears and a brake drum for accelerating said wheel relatively to said collar, a brake shoe cooperating with said drum, electromagnets for operating said brake shoes, a selective switch controlling said electromagnets, a movable fluid pressure plate, means cooperating said collar and said pressure plate for operating said switch.

5. A variable pitch propeller of the class described in claim 4, and means causing said wheel or said drum to be accelerated while the other is retarded by the application of its brake shoe.

6. A variable pitch propeller of the class described in claim 4, and interlocking means preventing simultaneous operation of said brake shoes.

7. A variable pitch propeller of the class described in claim 4, and means limiting the application of controlled power in reverse directions to said collar.

8. A variable pitch propeller of the class described in claim 4, and means for controlling the response of the pitch changing device to changes of air-speed of the plane.

CHANDLEY W. LAMBERT.